Figures 1, 2:
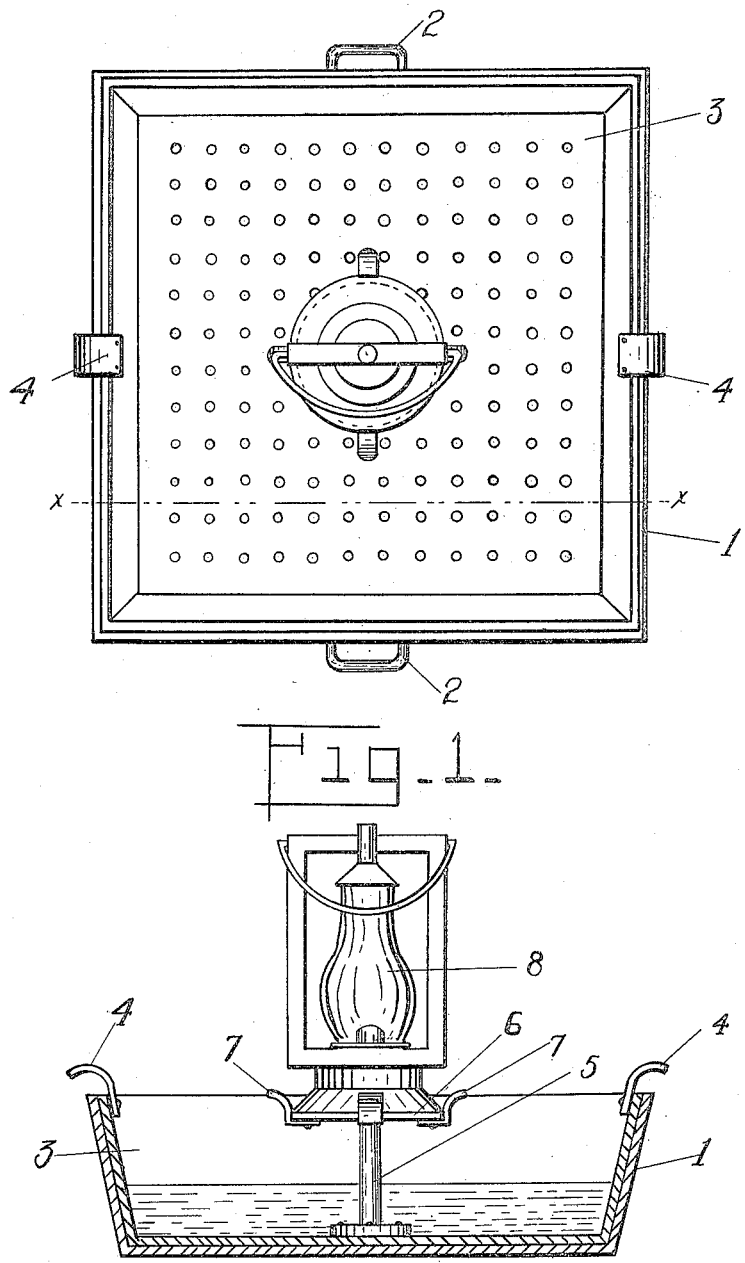

K. B. COOK.
INSECT TRAP.
APPLICATION FILED FEB. 17, 1913.

1,074,837.

Patented Oct. 7, 1913.

WITNESSES:

INVENTOR
Katherine B Cook.
BY
ATTORNEYS

UNITED STATES PATENT OFFICE.

KATHERINE B. COOK, OF HUBBARD, TEXAS.

INSECT-TRAP.

1,074,837.  Specification of Letters Patent.  Patented Oct. 7, 1913.

Application filed February 17, 1913. Serial No. 748,848.

*To all whom it may concern:*

Be it known that I, KATHERINE B. COOK, a citizen of the United States, residing at Hubbard, in the county of Hill and State of Texas, have invented certain new and useful Improvements in Insect-Traps, of which the following is a specification.

My invention relates to insect traps. Its object is to provide a device for entrapping and destroying such insects as infest growing plants and trees, comprising a lantern to attract the insects, and a pan above which the lantern is mounted, containing some liquid injurious to insect life into which the insects will drop from the lantern.

A further object of my invention is to provide such a trap of simple and durable construction which may easily and conveniently be emptied and which may employ the same liquid for destroying the insects that is burned as fuel in the lantern.

I have illustrated an exemplification of my invention in the accompanying drawing, in which—

Figure 1 is a top plan view of the device. Fig. 2 is a transverse section thereof on the line *x—x* of Fig. 1.

Referring more particularly to the drawing, reference character 1 designates a shallow metal pan, preferably zinc, and in this instance square, provided with flaring side walls. The pan 1 is provided with handles 2 for convenience in lifting. Loosely nested in the pan 1 is a screen 3 provided with handles 4. A centrally-disposed perpendicular pedestal 5 is riveted or otherwise rigidly secured to the bottom of the screen 3, and mounted on the upper end thereof is a disk 6 which carries on its periphery a plurality of spring clips 7 which grip and serve to hold in place a lantern or other source of light 8 having a base resting on the disk 6.

The trap is particularly designed to be used at night in an orchard or garden. A quantity of kerosene or kerosene and water, or other liquid injurious to insect life, is placed in the pan 1 and the lantern is lighted. The insects infesting the growing plants and trees are attracted by the light and fly against the lantern, falling back into the kerosene and are thereby destroyed. In the morning the screen 3 is conveniently lifted out of the pan 1 and the dead insects are emptied therefrom, after which it is put back in the pan which is then ready for the next night.

I claim:

1. In an insect trap, a receptacle adapted to contain a fluid, a second receptacle fitting within the first receptacle in contact with the walls thereof and having a foraminous bottom, handles at opposite sides of the second receptacle, a pedestal fixed on the bottom of the second receptacle, and a disk fixed at the top of the pedestal and provided with means for holding a lamp.

2. In an insect trap, a receptacle adapted to contain a fluid, a second receptacle fitting within the first receptacle in contact with the walls thereof and having a foraminous bottom, handles at opposite sides of the second receptacle, a pedestal fixed on the bottom of the second receptacle, a disk fixed on the top of the pedestal adapted to receive a lamp, and a plurality of lamp engaging spring clips secured to the disk.

In testimony whereof I have signed my name to this specification in the presence of two subscribing witnesses.

KATHERINE B. COOK.

Witnesses:
 J. E. JONES,
 THAD JONES.

---

Copies of this patent may be obtained for five cents each, by addressing the "Commissioner of Patents, Washington, D. C."